United States Patent
Deschaux et al.

(10) Patent No.: US 10,661,485 B2
(45) Date of Patent: May 26, 2020

(54) VULCANIZATION DEVICE FOR A TIRE AND VULCANIZATION METHOD

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Stéphane Deschaux, Clermont-Ferrand (FR); Stéphane Herault, Clermont-Ferrand (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 379 days.

(21) Appl. No.: 15/511,474

(22) PCT Filed: Sep. 24, 2015

(86) PCT No.: PCT/EP2015/071998
§ 371 (c)(1),
(2) Date: Mar. 15, 2017

(87) PCT Pub. No.: WO2016/046322
PCT Pub. Date: Mar. 31, 2016

(65) Prior Publication Data
US 2017/0291329 A1    Oct. 12, 2017

(30) Foreign Application Priority Data
Sep. 24, 2014   (FR) ...................................... 14 59018

(51) Int. Cl.
*B29C 35/04* (2006.01)
*B29D 30/06* (2006.01)

(52) U.S. Cl.
CPC ........ *B29C 35/049* (2013.01); *B29D 30/0662* (2013.01); *B29D 2030/067* (2013.01); *B29D 2030/0673* (2013.01)

(58) Field of Classification Search
CPC ............ B29D 30/0005; B29D 30/0662; B29D 30/0605; B29D 30/0606; B29D 30/06;
(Continued)

(56) References Cited

U.S. PATENT DOCUMENTS

| 4,370,283 A | 1/1983 | Arimatsu et al. ............... 264/37 |
| 7,985,359 B2 | 7/2011 | Mitamura et al. |
| 2010/0007038 A1 | 1/2010 | Mitamura et al. ........... 264/40.3 |

FOREIGN PATENT DOCUMENTS

| CN | 2389056 Y | 7/2000 |
| CN | 2471515 Y | 1/2002 |

(Continued)

OTHER PUBLICATIONS

May 30, 2018 Chinese Official Action in Chinese Patent Appln. No. 201580051946.3.
(Continued)

*Primary Examiner* — Alexander M Weddle
(74) *Attorney, Agent, or Firm* — Venable LLP

(57) ABSTRACT

A vulcanizing device for a tire includes a mold, a central part, a curing bladder, and an injector. The central part is positioned inside the mold and supports the curing bladder, which is arranged to press firmly against an internal part of a tire. An internal part of the curing bladder defines a vulcanizing chamber, which holds a pressurized heat-transfer fluid. The heat-transfer fluid, which is a mixture of steam and pressurized gas, circulates in the vulcanizing chamber and between an inlet pipe leading into the vulcanizing chamber and an outlet pipe leading out of the vulcanizing chamber. The injector is arranged outside the vulcanizing (Continued)

chamber and is connected to the inlet pipe, the outlet pipe, and a supply pipe for supplying steam or pressurized gas. The injector is structured to mix steam or pressurized gas coming from the supply pipe with the heat-transfer fluid leaving the vulcanizing chamber.

10 Claims, 2 Drawing Sheets

(58) Field of Classification Search
CPC ............ B29D 30/0601; B29D 30/0643; B29D 30/0678; B29D 30/0681; B29D 30/0016; B29D 30/0629; B29D 30/0645; B29D 2030/0022; B29D 2030/0027; B29D 2030/063; B29D 2030/0612; B29D 2030/0631; B29D 2030/067; B29D 2030/0673; B29D 2030/0675; B29D 2030/0646; B29D 2030/0655; B29D 2030/0666; B29D 2030/0669; B29C 35/049

USPC ........................................................ 264/326
See application file for complete search history.

(56) References Cited

FOREIGN PATENT DOCUMENTS

| | | | |
|---|---|---|---|
| CN | 101547775 A | 9/2009 | |
| EP | 0 050 522 A1 | 4/1982 | |
| EP | 0 052 378 A1 | 5/1982 | |
| EP | 0052378 A1 * | 5/1982 | ......... B29C 35/0294 |
| EP | 2 444 242 A1 | 4/2012 | |
| JP | H08-80530 A | 3/1996 | |

OTHER PUBLICATIONS

Dec. 10, 2015 International Search Report and Written Opinion in International Patent Appln. No. PCT/EP/2015/071998.

* cited by examiner

VULCANIZATION DEVICE FOR A TIRE AND VULCANIZATION METHOD

FIELD OF THE INVENTION

The invention relates to the field of the vulcanizing of tires and is more particularly concerned with the vulcanizing devices that comprise a chamber for curing the tires.

RELATED ART

In a known way, a vulcanizing device comprises a curing chamber in which a green tire is installed. A heat-transfer fluid, generally hot water or steam under pressure, circulates in the vulcanizing device between a supply source and the curing chamber. The chamber as a general rule comprises a rigid mold intended to form the impression of the exterior part of the tire. A flexible and elastic bladder, under the effect of the increase in pressure of the heat-transfer fluid, becomes pressed firmly against the internal wall of the tire so as to allow the tread pattern elements of the mold to penetrate deeply into the green tire that is to be vulcanized.

The heat-transfer fluid is introduced at a very high temperature and a very high pressure into the flexible bladder so as to press it firmly against the green tire and exchange heat energy therewith, via the bladder, so as to mold the green tire in the tread patterns of the rigid mold. The pressure and temperature need to be kept at pre-established values for the duration of the vulcanization of the tire. It has been found that when using saturated steam or hot water, a high temperature needs to be maintained inside the bladder for the entire duration of vulcanizing. Moreover, at high pressure values the temperature rises to values that are too high and present problems of overcuring the green tire if the temperature is maintained for a full curing duration.

One solution to these problems has been described in document U.S. Pat. No. 4,370,283 which by way of heat-transfer fluid uses a mixture of steam and an inert gas based on nitrogen, in which mixture the steam is the temperature vector and the inert gas is the pressure vector. According to that document, the steam is initially introduced into the flexible bladder at atmospheric pressure and at the curing temperature for a few minutes, then the steam supply is shut off so that the inert gas can be introduced at high pressure in order to press the green tire firmly against the impressions of the mold. However, in order to be to transfer the heat energy uniformly to the bladder, and therefore to the green tire that is to be vulcanized, the inert gas needs to be uniformly mixed with the steam inside the bladder.

Another source, document JP08-080530, discloses a tire vulcanizing method in which, in order to mix the steam and the nitrogen, the steam is injected into the membrane first of all, followed by the injection of nitrogen and several stages of agitating the mixture inside the bladder. This way of achieving mixing with several successive injection phases followed by the removal of condensate the collected at the bottom of the bladder does, however, prove to be less productive and to be complex to implement.

To remedy that, document CN 2389056 proposes another solution whereby the steam and the nitrogen are injected into the curing bladder simultaneously. According to that document, the nitrogen is introduced in an oblique direction oriented towards the upper part of the bladder and the steam is introduced into the bladder in a horizontal direction. Because nitrogen is heavier than steam, it then falls down onto the steam situated in the lower part of the bladder. However, the mixing obtained is not homogeneous, because the two gases stratify as therefore does the temperature inside the bladder, the consequence of this being defective curing of the tire. On top of that, a pocket of condensate forms in the bottom of the bladder, which condensate has to be removed via a flexible tube arranged inside the latter. This complicates the structure of the central part of the mold and also has an effect on the productivity of the vulcanizing method.

Document EP 0 052 378 is also known and describes a vulcanizing device comprising a bladder into which there opens a first pipe supplying a mixture of steam and a pressurized gas, a second, discharge, pipe being provided beside the first one. According to that document, the gas and the steam are mixed outside the bladder, before introducing the mixture into the bladder via the first pipe, when it reaches the pre-established curing parameters. Even though they are mixed before being introduced into the bladder it is found that the two fluids stratify during curing, this having the effect of creating a difference in temperature between the upper part and the lower part of the mold and, therefore, leading to non-uniform curing of the tire.

BRIEF DESCRIPTION OF EMBODIMENTS OF THE INVENTION

The objective of the invention is to provide a vulcanizing device capable of overcoming these disadvantages.

This objective is achieved with a vulcanizing device for a tire comprising a central part for supporting a curing bladder intended to be pressed firmly against the internal part of a tire, inside a mold, the internal part of the bladder defining a vulcanizing chamber in which there circulates a pressurized heat-transfer fluid which is a mixture of steam and of pressurized gas, the said heat-transfer fluid being made to circulate between an inlet pipe leading into the chamber and an outlet pipe leaving the chamber, characterized in that it comprises an injector arranged outside the vulcanizing chamber while being connected to the chamber inlet and outlet pipes, and to a steam or pressurized-gas supply pipe and which is produced in such a way as to mix the steam or the pressurized gas coming from the supply pipe with the fluid leaving the vulcanizing chamber.

According to the invention, such an injector is used to mix fluid present in the vulcanizing chamber with steam or pressurized gas coming from a supply pipe as the fluid from the supply pipe is being introduced into the injector and before this mixture is sent into the vulcanizing chamber (which corresponds to the inside of the curing bladder when the mold is closed). The heat-transfer fluid present in the vulcanizing chamber during vulcanizing is a mixture of steam and of pressurized gas. The steam provides the heat energy necessary for curing and/or some of the pressure and a pressurized gas supplies the pressure or the balance of the pressure needed for the mixture to attain the curing parameter values (temperature and pressure) to vulcanize the tire. A heat-transfer fluid is chosen that is in the form of a mixture of steam and of pressurized gas so that the various curing parameters (temperature and pressure) can be regulated independently, the injector allowing these fluids to be mixed properly before they are sent into the curing bladder, this being before and during curing.

Specifically, the injector of the invention makes it possible to mix the fluid (steam or pressurized gas) arriving via its supply pipe with the fluid which is already present inside the curing bladder (steam and/or pressurized gas) in order to obtain a homogenous mixture of the whole. Because the mixture is homogenous, it allows the heat energy to be transmitted uniformly to the green tire, without stratification in the axial direction of the components, and to obtain uniform curing of the tire.

Advantageously, the said injector comprises a Venturi-effect tube connected to the inlet and outlet pipes and to a steam or pressurized-gas supply pipe.

The Venturi-effect tube allows a uniform mixing of two fluids which is based solely on a difference in pressure of the two fluids inside the tube. This then avoids the use of a pump or other mixing device that requires an electrical power supply. This tube thus allows the fluid already present in the vulcanizing chamber (gas or a mixture of gas and steam) to be drawn up with the fluid (gas or steam) arriving along the supply pipe.

Advantageously, the said Venturi-effect tube comprises an outlet opening which connects it to a condensate drain and collection pipe.

With preference, the said Venturi-effect tube comprises a convergent ejection cone communicating with a convergent mixing cone that mixes steam or pressurized gas coming from a supply pipe with the fluid leaving the chamber, the said mixing cone communicating with the chamber inlet pipe via a divergent injection cone. Such a Venturi tube makes it possible to draw up fluid coming from the vulcanizing chamber and to mix it with the steam or the pressurized gas coming from a supply pipe before the mixture is sent into the bladder.

Advantageously, the said injector mixes the steam coming from a supply pipe with the pressurized gas leaving the vulcanizing chamber.

Thus, the pressurized gas is initially sent into the bladder, in order to create a first pressurizing for a premolding of the green tire, and then the heat-transfer fluid is introduced into the injector and it supplies the heat energy and the balance of the pressure needed for curing. This makes it possible to obtain a homogenous mixing of the two fluids and therefore uniform temperature inside the curing bladder right from the start of curing.

With preference, the said injector mixes the heat-transfer fluid of the vulcanizing chamber with the steam or a pressurized gas coming from the supply pipe.

Thus, the said injector performs continuous mixing, during curing, by supplying the vulcanizing chamber, via the injector, with steam or with pressurized gas. This supply of gas or steam to the injector allows the heat-transfer fluid already present in the bladder to be drawn up and mixed together constantly, thereby avoiding the stratification of the fluids of which it is composed and making it possible to obtain a uniform mixture temperature during curing.

Advantageously, the pressurized gas is chosen from: nitrogen, hydrogen or compressed air, considered alone or in combination. Steam is chosen from economical reasons of heating and pressurized gas is chosen so as to be able to regulate its pressure independently of the temperature. It is preferable to choose an inert gas, such as nitrogen, so as to protect the curing bladder and thus extend its life.

The objective of the invention is also achieved by a vulcanizing method which uses a device according to the invention.

With preference, the said injector is supplied with steam after the pressurized gas has previously been introduced into the vulcanizing chamber. This makes it possible to create a uniform mixture of the two fluids prior to curing.

Advantageously, the said injector is supplied with steam or with pressurized gas when the value of the pressure during curing has been regulated between two thresholds. That makes it possible to have the fluid present inside the bladder circulating continuously via the said injector throughout the duration of the curing of the tire.

With preference, the said mixture is brought, for all or part of the vulcanizing cycle, to a temperature comprised between 150 and 205° C. and to a pressure comprised between 14 and 18 bar. It has been found during laboratory tests that the injector of the invention makes it possible to obtain a uniform mixture of steam and nitrogen with these values for the parameters needed for curing a tire as used for a passenger vehicle or heavy goods vehicle.

BRIEF DESCRIPTION OF THE DRAWINGS

The following description is supported by FIGS. 1 to 2 in which.

DETAILED DESCRIPTION OF EMBODIMENTS OF THE INVENTION

Figure 1:
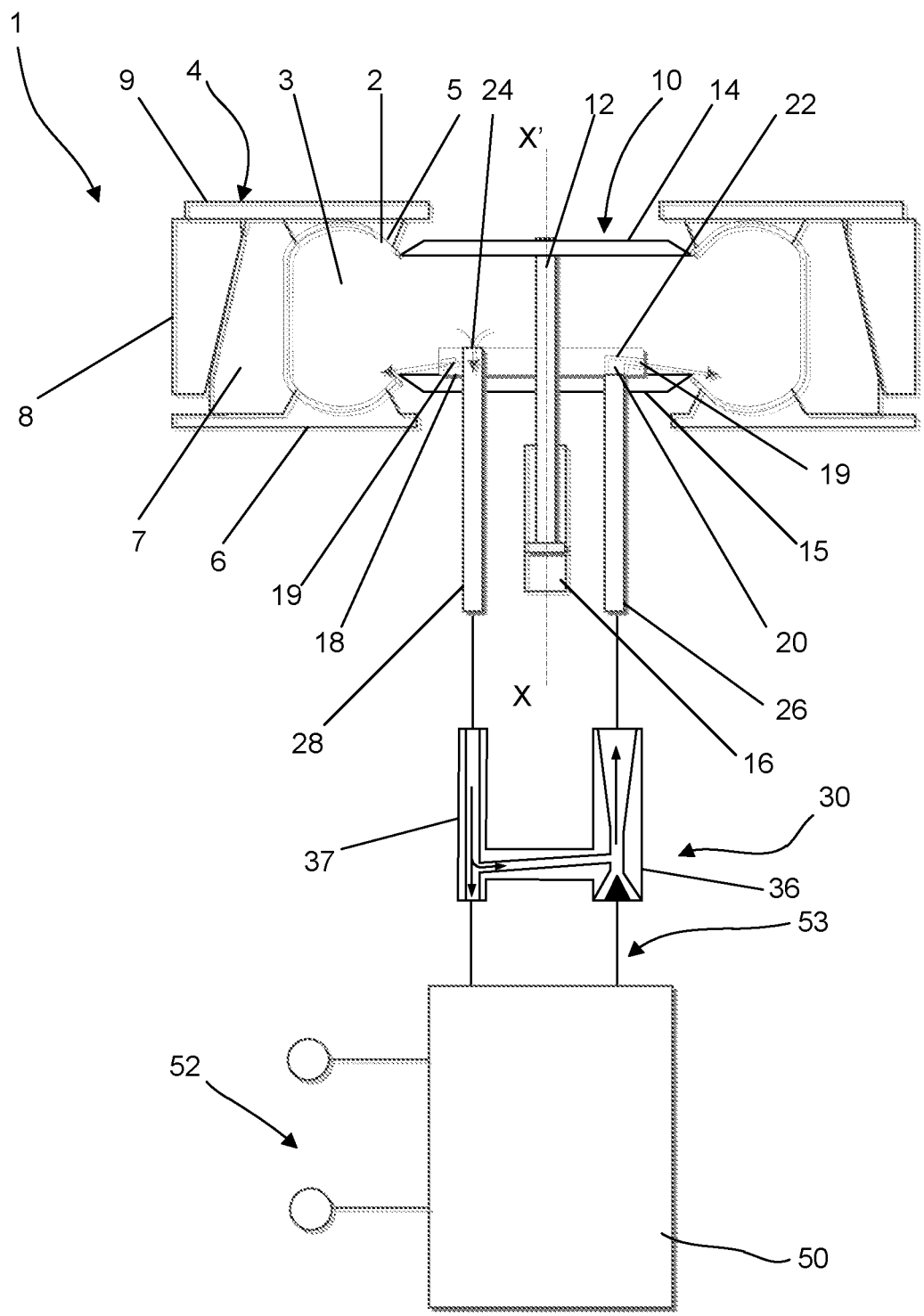
FIG. 1 depicts a schematic view in cross section of a vulcanizing device comprising an injector according to the invention.

The vulcanizing device 1 depicted in FIG. 1 comprises a flexible curing bladder 2 which collaborates in a known way with a rigid mold 4 intended to confer its exterior shape on the tire. The mold 4 proper is formed of two shells 5, 6 intended to mold the sidewalls of the tire, and by annular segments 7 intended to mold the tread. The annular segments 7 are driven in a radial translational movement when made to move by an annular ring 8 via a platen 9 of the press, which platen is moved axially by a ram of this press. The internal surfaces of the shells 5, 6 and of the annular segments 7 together define a chamber of toroidal overall shape having an axis of revolution XX'.

The central part 10 of the mold 4 comprises an operating spindle 12, concentric with the axis of revolution XX' of the chamber, intended to drive the upper 14 and lower 15 platens during the phases of introducing and extracting the tire. The curing bladder 2 is fixed by its upper and lower bead seat to the upper platen 14 and to the lower platen 15. The upper platen 14 is driven in an axial translational movement by a hydraulic ram 16 to cause the bladder 2 to move between a position in which the latter is folded, as a green tire is being introduced into the chamber of the mold and as the tire is being extracted at the end of curing, and a position in which it is tensioned inside the green tire with a view to curing. During curing, the bladder 2 is expanded to press the tire firmly against the impressions of the annular segments 7 and of the shells 5, 6, the internal part of the bladder thus delimiting a vulcanizing chamber 3 inside which the heat-transfer fluid circulates.

The lower platen 15 of the central part 10 supports a diffusion plate 18 comprising several orifices 19 uniformly distributed over its circumference. The orifices communicate with an annular chamber 20 for the distribution of the pressurized heat-transfer fluid. The annular chamber has a fluid inlet 22 and outlet 24 which are connected, the first of them to an inlet pipe 26 and the second to an outlet pipe 28 of the heat-transfer fluid. The circulation of the heat-transfer fluid between the inlet 22 and the outlet 24 and the pressure and temperature parameters thereof are managed by a control unit 50 via an injector 30 of the invention and a fluid circuit 53 generally known, as will be explained later on. The control unit 50 comprises an electrical power supply 52, an internal data storage memory and software to run an operating cycle of the vulcanizing device. The input in the control unit 50 receives data coming from pressure and temperature sensors of the device 1 and the output of the control unit 50 is connected to the various steam and pressurized-gas supply valves of the fluid circuit 53 the opening and closing of which it controls. The pressure and temperature sensors are, for example, arranged inside the bladder 2.

Figure 2:
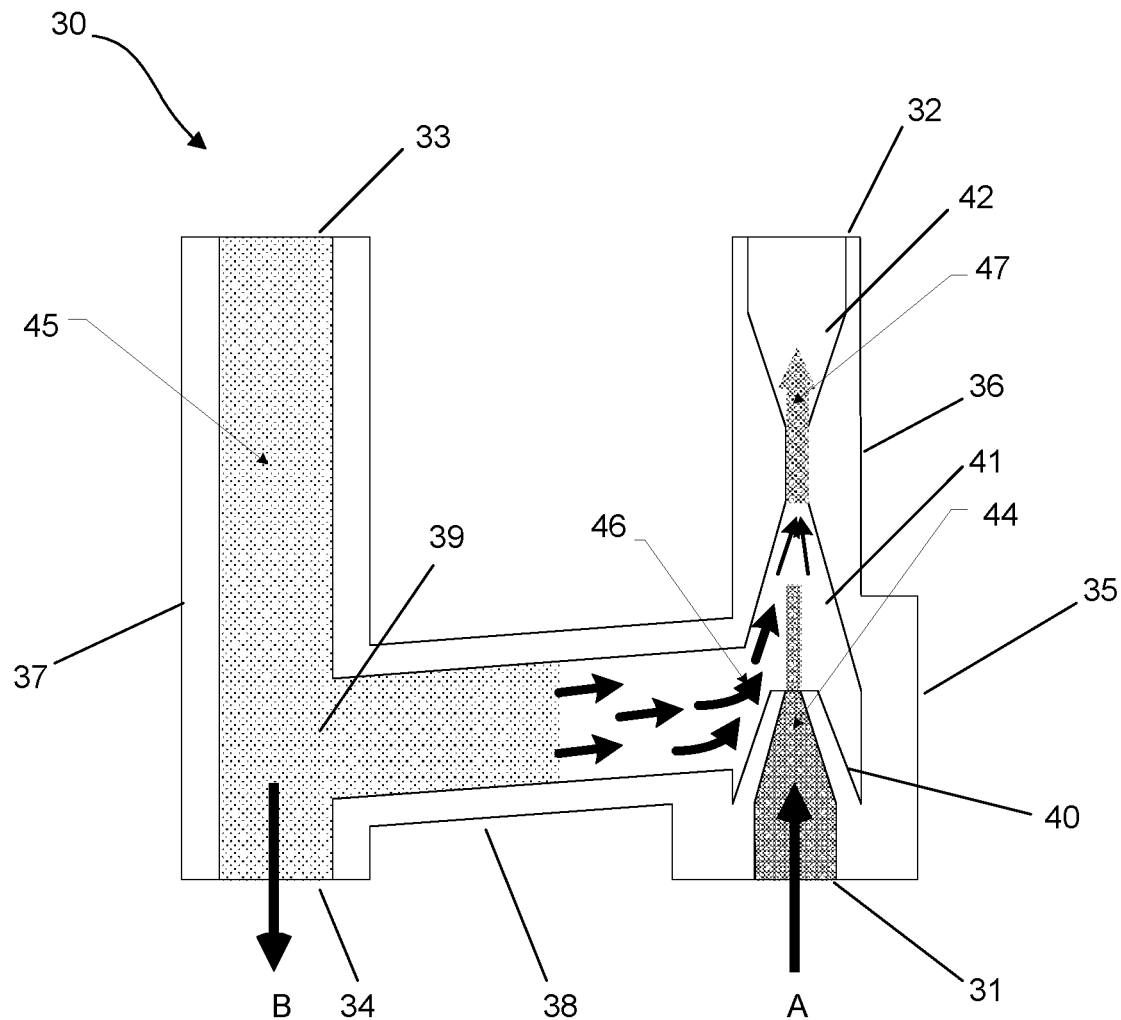
FIG. 2 depicts a schematic view in cross section of the injector of the invention.

The structure and operation of the injector 30 of the invention will be explained with reference to FIG. 2. The injector 30 is a Venturi-effect injector which comprises a body 35 comprising a first tube 36, a second tube 37 which are mutually parallel and joined together by a transverse third tube 38, these tubes defining a space for the circulation of fluid inside the body 35.

The first tube 36 comprises a fluid inlet opening 31 which is placed in communication via connectors (not depicted in the figures) with a pipe for the arrival of pressurized fluid, coming from a steam or pressurized-gas supply pipe, which fluid enters the body 35 of the injector in the direction of the arrow A. The fluid arrives in a convergent ejection cone 40 which opens into a convergent mixing cone 41. The outlet of the mixing cone 41 is connected to the inlet of a divergent injection cone 42. The fluid reemerges from the injection cone 42 via an outlet opening 32. The outlet opening 32 is connected by connectors (not depicted) to the inlet pipe 26 that lets fluid into the bladder 2.

The second tube 37 comprises a fluid inlet opening 33 which is placed in communication via connectors (not depicted in the figures) with a pipe admitting pressurized fluid coming from the bladder 2 into the body 35. The second tube 37 comprises an outlet opening 34 for fluid to leave in the direction of the arrow B and a communication passage 39 communicating with the transverse tube 38. The outlet opening 34 is connected by connectors (not depicted) to a pipe for draining and collecting condensate from the fluid circuit 53 of the vulcanizing device 1. The drain pipe is connected to a drain valve (not depicted).

The operation of the vulcanizing device 1 of the invention will be explained in what follows. A green tire is introduced into the device, the green tire being held in the press using the bladder in a preshaping state using steam until the press closes. The steam is sent directly into the bladder via the tube 36 of the injector 30 or via a bypass pipe arranged in parallel therewith (not depicted).

A premolding step is then performed in which the necessary quantity of nitrogen is introduced so as to reach the pre-established pressure and temperature set points required for the next curing phase. The nitrogen is introduced directly into the bladder via the bypass pipe up to a premolding pressure set point value p1 which is selected on the basis of the curing temperature. In an alternative form, the introduction of nitrogen may also take place via the tube 36 of the injector 30 in this step.

The set point temperature during curing corresponds to a given pressure according to the Mollier diagram. Thus, in one exemplary embodiment, for the curing phase the pressure set point value p for the curing phase is set at 16 bar and the temperature set point value at 179° C. For a curing temperature of 179° C., the steam pressure according to the Mollier diagram $p_m$ is 9 bar. Therefore the premolding pressure of the nitrogen is $p_1 = p - p_m$, and equal to 7 bar in this example.

When the set point value for the pressure in the premolding phase is reached, the control unit 50 commands the switching-off of the nitrogen supply and the sending of steam into the bladder 2 via the injector 30, in the direction of arrow A. The supply of steam via the injector 30 allows nitrogen to be drawn up leaving the bladder by a Venturi effect and allows the nitrogen-steam mixture to be homogenized. As it passes through the reduced-section outlet nozzle of the ejection cone 40, the stream of high-pressure steam 44 is accelerated and draws the stream of nitrogen 45 from the tube 38, a proportion 46 of which reaches the mixing cone 41 and mixes with the steam. The mixture 47 of steam and of nitrogen thus obtained is injected into the bladder 2 through the injection cone 42, the tube 26 and the orifices 19. Any condensate there might be leaves the second tube 37 via the outlet orifice 34 and is collected in a condensate storage bottle (not depicted). Thus, the injector 30 of the invention makes it possible, throughout the steam supply duration, to ensure a continuous mixing and circulation of steam and nitrogen already making it possible to obtain a homogeneous mixture within the bladder, right from the start of curing.

As soon as the pressure set point value for the curing phase is reached, regulation is imposed that makes it possible to achieve the set point temperature while at the same time regulating the pressure value to between two threshold values, by causing steam or nitrogen to pass through the inlet of the injector 30 and maintain the stirring of the nitrogen-steam mixture contained in the bladder so as to guarantee the uniformity of the mixture throughout the curing duration.

More particularly, during the curing phase, regulation is performed continuously keeping between two pressure thresholds $p_{min}$ and $p_{max}$ (which correspond to tolerances established around set point pressure p). For that, injections of steam or of nitrogen, or even bleeds of mixture where necessary, are performed through the injector 30, according to the values measured by the sensors of the pressure and temperature within the bladder 2, comparing these against the values of the pressure threshold $p_{min}$ and $p_{max}$ and temperature threshold $T_{min}$ and $T_{max}$ (which are likewise values corresponding to tolerances established on either side of the set point curing temperature T). Thus, when the measured pressure is below a value $p_{min}$ and the measured temperature is below $T_{max}$, steam is injected into the bladder 2 via the tube 36 of the injector 30. If the measured pressure is below $p_{min}$ but the temperature is above $T_{max}$, nitrogen is injected through the tube 36 of the injector 30. When the measured pressure is below the set point value p for curing and the temperature is below $T_{min}$, a bleed is performed followed by an injection of steam via the injector 30. The injection of fluid via the injector 30 is halted when the measured pressure is above $p_{max}$.

Thus, thanks to this regulation between two pressure thresholds throughout the duration of the curing phase, successive introductions of fluid take place via the injector 30 which via the outlet piping of the vulcanizing chamber draws back up the fluid contained therein, making it possible during curing to sustain a movement of fluid between the injector 30 and the vulcanizing chamber. That makes it possible to guarantee uniform mixing throughout curing and thus to avoid the thermal asymmetry which is caused by the stratification of the nitrogen during curing. Furthermore, that also allows stirring up and removal of condensate from the lower part of the bladder 2.

In one exemplary embodiment, the tubes 37, 38 have the same internal diameter which is equal to the internal diameter of the inlet 31 and of the outlet 32 of the tube 36. The diameter of the inlet orifice in the mixing cone 42 is equal to approximately twice the diameter of the outlet orifice of the ejection cone 40 and to approximately four times the internal diameter of the tubes 37, 38.

At the end of curing, the bladder is decompressed and the mixture is emptied out under gravity to a condensate collecting bottle, in the direction of the arrow B. The device 1 is then opened and the tire removed.

Other alternative forms and embodiments of the invention may be envisaged without departing from the context of the claims thereof. Thus, the increase in pressure may be accomplished continuously or in successive stages.

The invention claimed is:

1. A vulcanizing device for a tire, the device comprising:
   a mold;
   a curing bladder having an internal part that defines a vulcanizing chamber;
   a central part positioned inside the mold, the central part being structured to support the curing bladder so that the curing bladder presses against an internal part of a tire during vulcanization of the tire;
   an inlet pipe through which fluid enters the vulcanizing chamber;
   an outlet pipe through which fluid leaves the vulcanizing chamber; and
   an injector,
   wherein the vulcanizing chamber is configured to hold a pressurized heat-transfer fluid such that the pressurized heat-transfer fluid circulates in the vulcanizing chamber and between the inlet pipe and the outlet pipe,
   wherein the injector is arranged outside of the vulcanizing chamber, is connected to the inlet pipe and the outlet pipe, and comprises a fluid inlet opening through which steam or pressurized gas is supplied to the injector,
   wherein the injector receives, via the outlet pipe, the pressurized heat-transfer fluid that has left the vulcanizing chamber, and
   wherein the injector is configured to (1) mix (a) the steam or the pressurized gas supplied to the injector via the fluid inlet opening with (b) the pressurized heat-transfer fluid that was received from the vulcanizing chamber via the outlet pipe, to obtain a mix, and (2) provide the mix to the vulcanizing chamber via the inlet pipe.

2. The device according to claim 1, wherein the injector includes a Venturi-effect tube connected to the inlet pipe and the outlet pipe.

3. The device according to claim 2, wherein the Venturi-effect tube includes an outlet opening that connects the Venturi-effect tube to a condensate drain and collection pipe.

4. The device according to claim 2, wherein the Venturi-effect tube includes a convergent ejection cone in communication with a convergent mixing cone that mixes the steam or the pressurized gas with the pressurized heat-transfer fluid that has left the vulcanizing chamber via the outlet pipe, the mixing cone being in communication with the inlet pipe via a divergent injection cone.

5. The device according to claim 1, wherein the pressurized gas is one of or is any combination of: nitrogen, hydrogen, and compressed air.

6. A vulcanizing device for a tire, the device comprising:
   a mold;
   a curing bladder having an internal part that defines a vulcanizing chamber;
   a central part positioned inside the mold, the central part being structured to support the curing bladder so that the curing bladder presses against an internal part of a tire during vulcanization of the tire;
   an inlet pipe through which fluid enters the vulcanizing chamber;
   an outlet pipe through which fluid leaves the vulcanizing chamber; and
   an injector,
   wherein the vulcanizing chamber is structured to hold a pressurized heat-transfer fluid such that the pressurized heat-transfer fluid circulates in the vulcanizing chamber and between the inlet pipe and the outlet pipe,
   wherein the injector is arranged outside of the vulcanizing chamber, is connected to the inlet pipe and the outlet pipe, and comprises a fluid inlet opening through which steam or pressurized gas is supplied to the injector,
   wherein the injector is structured to enable the steam or the pressurized gas supplied via the supply pipe to mix with the pressurized heat-transfer fluid leaving the vulcanizing chamber via the outlet pipe,
   wherein the injector includes a Venturi-effect tube connected to the inlet pipe, the outlet pipe, and the supply pipe, and
   wherein the Venturi-effect tube includes an outlet opening that connects the Venturi-effect tube to a condensate drain and collection pipe.

7. A method of vulcanizing a tire, the method comprising steps of:
   installing a green tire in a vulcanizing device, the vulcanizing device including: (a) a mold, (b) a curing bladder having an internal part that defines a vulcanizing chamber, (c) a central part positioned inside the mold, the central part being structured to support the curing bladder so that the curing bladder presses against an internal part of the tire during vulcanization of the tire, (d) an inlet pipe through which fluid enters the vulcanizing chamber, (e) an outlet pipe through which fluid leaves the vulcanizing chamber, and (f) an injector arranged outside of the vulcanizing chamber, wherein the injector is connected to the inlet pipe and the outlet pipe, and wherein the injector comprises a fluid inlet opening through which steam or pressurized gas is supplied to the injector;
   circulating a pressurized heat-transfer fluid in the vulcanizing chamber and between the inlet pipe and the outlet pipe, wherein the injector receives, via the outlet pipe, the pressurized heat-transfer fluid that has left the vulcanizing chamber;
   mixing, at the injector, (a) the steam or the pressurized gas supplied to the injector via the fluid inlet opening with (b) the pressurized heat-transfer fluid that was received from the vulcanizing chamber via the outlet pipe; and
   providing the mix to the vulcanizing chamber via the inlet pipe.

8. The method according to claim 7, wherein, in the mixing step, the injector is supplied with the steam after the pressurized gas has been introduced into the vulcanizing chamber.

9. The method according to claim 7, further comprising a step of supplying the injector with the steam or the pressurized gas when a curing pressure has been regulated to a value between two thresholds ($p_{min}$, $p_{max}$).

10. The method according to claim 7, further comprising steps of:
    heating a mixture forming the pressurized heat-transfer fluid to a temperature between 150° C. and 205° C.; and
    establishing, for the mixture, a pressure between 14 bar and 18 bar,
    wherein, for at least a portion of a vulcanization cycle, the temperature of the mixture is between 150° C. and 205° C. and the pressure of the mixture is between 14 bar and 18 bar.

* * * * *